(12) United States Patent
Bricko

(10) Patent No.: US 6,186,242 B1
(45) Date of Patent: Feb. 13, 2001

(54) DEPTH GAUGE FOR A VIBRATORY PLOW

(75) Inventor: Thomas K. Bricko, Lakeville, MN (US)

(73) Assignee: The Toro Company, Bloomington, MN (US)

(*) Notice: Under 35 U.S.C. 154(b), the term of this patent shall be extended for 0 days.

(21) Appl. No.: 09/377,793

(22) Filed: Aug. 20, 1999

(51) Int. Cl.[7] .................................................. A01B 35/00
(52) U.S. Cl. ........................... 172/40; 37/367; 405/181; 405/182
(58) Field of Search ..................... 172/40, 430, 720, 172/776, 699; 37/366, 367, 370, 904; 405/182, 180, 184

(56) References Cited

U.S. PATENT DOCUMENTS

| | | | | |
|---|---|---|---|---|
| 340,128 | * | 4/1886 | Kersey | 33/625 |
| 1,300,371 | * | 4/1919 | French | 33/625 |
| 3,760,595 | * | 9/1973 | Stewart et al. | 172/40 |
| 4,028,822 | * | 6/1977 | Teach | 37/86 |
| 4,398,478 | * | 8/1983 | Frase et al. | 111/85 |
| 4,763,735 | * | 8/1988 | Gay | 175/161 |
| 4,909,332 | * | 3/1990 | Lindstrom | 172/40 |
| 5,039,252 | * | 8/1991 | Schuermann | 405/182 |
| 5,325,798 | * | 7/1994 | Nowell et al. | 111/99 |
| 5,482,121 | * | 1/1996 | Draney et al. | 172/40 |
| 5,934,833 | * | 8/1999 | Hunter et al. | 405/180 |
| 5,957,219 | * | 9/1999 | Friggstad | 172/395 |

* cited by examiner

Primary Examiner—Victor Batson
(74) Attorney, Agent, or Firm—Mau & Krull, P.A.

(57) ABSTRACT

A depth gauge (30) is connected to a vibratory plow (10) for indicating the depth of a blade (13). The depth gauge (30) has a rod (31) pivotally connected to the housing (11). The rod (31) has a first end (31a), a second intermediate ground following portion (31b) and a second end (31c). An indicator bar (36) has its first end (36a) connected to the second end (31c) of the rod (31). A depth indicator (50) is provided. The second end of the rod (31c) is restrained for a general vertical movement proximate the depth indicator (50), wherein as the housing (11) is raised or lowered, the ground following portion (31b) stays in contact with the ground and results in pivotal movement of the rod (31) and thereby a vertical displacement of the indicator bar (36), thereby providing a depth gauge.

20 Claims, 5 Drawing Sheets

DEPTH GAUGE FOR A VIBRATORY PLOW

BACKGROUND OF THE INVENTION

1. Field of the Invention

This invention relates generally to vibratory plows for laying pipe and/or cable, and more particularly to a vibratory plow having a ground following depth gauge.

2. Description of the Prior Art

The use of vibratory plows for laying pipe, especially irrigation pipe, is well known. The vibratory plow has a blade that is moved rapidly in an up and down direction thereby making a cut in the turf. Attached to the bottom of the blade is a pipe puller attachment. The pipe is attached to the pipe puller attachment and moves along with the vibratory plow as it moves across the turf. The pipe is typically supplied on a reel. When laying the pipe, the pipe is usually set at the maximum depth of the blade.

However, there are instances where it is desirable to lift the plow upward so that the pipe may be laid at a different elevation. This will usually come when a pipe is being laid across another pipe and it is not desired to have the blade cut the pipe that was laid first. It is desirable to know how far the blade has been lifted during this process so that sufficient clearance is maintained between the first pipe that has been laid and the second pipe that is being laid. Further, it is advantageous to not raise the level too high so that the second laid pipe does not come too close to the surface of the ground. Under certain circumstances, the pipe is laid at less than maximum depth and it may be advantageous to both raise and lower the depth. Also, changes in soil density may effect the depth the blade penetrates the soil. To date, the operator of the vibratory plow uses the hydraulic mechanisms available at the operator's control panel to raise and lower the plow. However, there is no method for the operator to determine how far the plow has been raised other than by visually looking at the plow itself. This is far from accurate, especially for detecting changes in soil density, and the present invention has been developed to address the problems associated with the prior art.

SUMMARY OF THE INVENTION

The present invention is a depth gauge for use with a vibratory plow apparatus having a housing for enclosing a vibratory plow mechanism. The depth gauge includes a rod pivotally connected to the housing. The rod has a first end pivotally connected to the housing, a second intermediate ground following portion and a second end. An indicator bar has a first end operatively connected to the second end of the rod and a second end. Also included is a depth indicator. The second end of the indicator bar is restrained for general vertical movement proximate the depth indicator, wherein as the housing is raised or lowered, the ground following portion stays in contact with the ground and results in pivotal movement of the rod and thereby in a vertical displacement of the indicator bar, thereby providing a depth gauge.

In another embodiment, the invention is a vibratory plow with a depth gauge. A housing enclosing a vibratory plow mechanism. The rod has a first end pivotally connected to the housing, a second intermediate ground following portion and a second end. An indicator bar has a first end operatively connected to the second end of the rod and a second end. Also included is a depth indicator. The second end of the indicator bar is restrained for general vertical movement proximate the depth indicator, wherein as the housing is raised or lowered, the ground following portion stays in contact with the ground and results in pivotal movement of the rod and thereby in a vertical displacement of the indicator bar, thereby providing a depth gauge.

DETAILED DESCRIPTION OF THE PREFERRED EMBODIMENT

Figure 1:
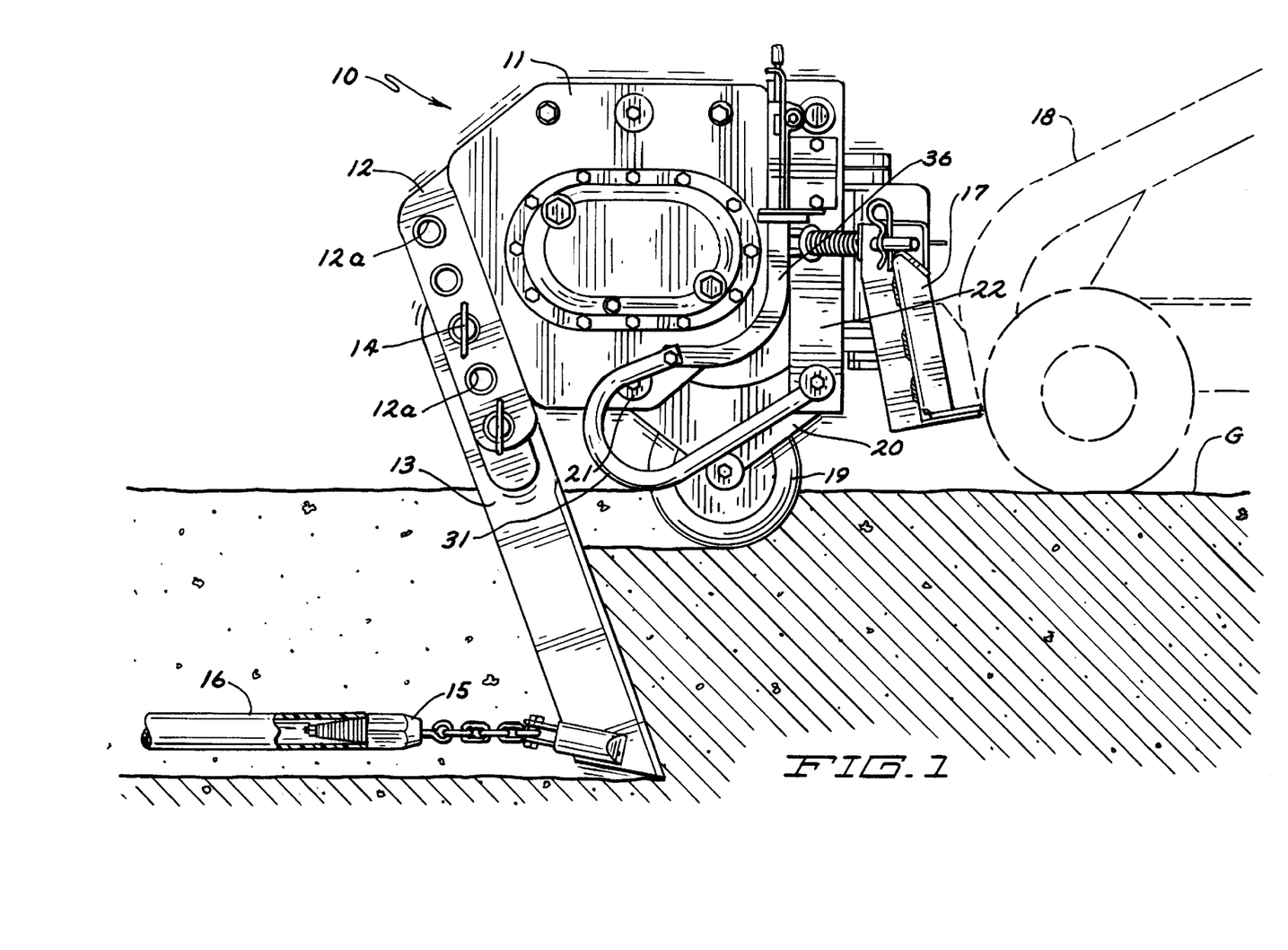
FIG. 1 is a side elevational view of a vibratory plow incorporating the depth gauge of the present invention.
Figure 2:
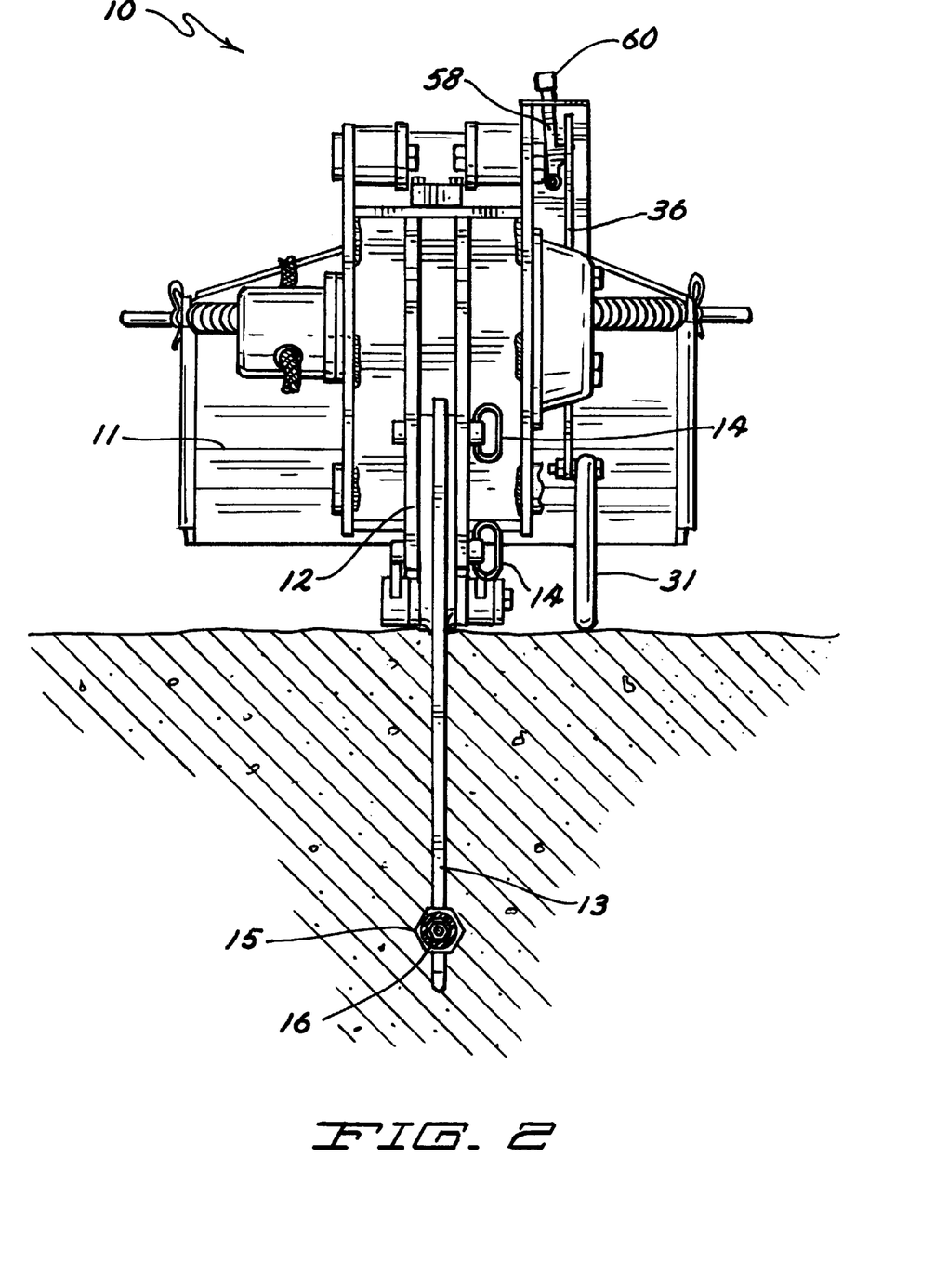
FIG. 2 is a front elevational view of the vibratory plow shown in FIG. 1.

Referring to the drawing, wherein like numbers represent like parts throughout the several views, there is generally disclosed at 10 a vibratory plow. The vibratory plow 10 includes a housing/frame 11 in which motors (not shown) are secured. The motors are connected to a vertical sliding mechanism 12. The motors drive the mechanism 12 in a generally vertical direction and provide the oscillating movement to the blade 13. The blade 13 is operatively connected to the mechanism 12 by a suitable mechanical fastener such as a pin assembly 14. The blade is releasably connected to the mechanism 12 through a plurality of holes 12a. Depending upon the depth which the operator wants the blade 13 to extend, the blade may be positioned in different sets of holes 12a. Further, the blade may be reversed in the direction shown in FIG. 1, so that the blade sticks upward for a transport mode. A puller 15 is pivotally connected to the blade 13 by suitable means such as a chain and pivoting bracket, or by other means well known in the art. The pipe 16 which is being laid is suitably connected to the puller 15. A suitable attachment mechanism 17 is connected at one end to the housing 11 and at the other end to a traction unit 18, shown in phantom in FIG. 1. The traction unit 18 provides the motive force to move the vibratory plow 10. The traction unit 18 also has suitable hydraulic controls to raise and lower the attachment mechanism 17, and thereby the housing 11. A coulter wheel 19 is rotatably mounted on a link 20 which in turn is connected to the frame 11 by suitable means such as pins 21. The plow assembly 10, described so far and the traction unit 18, may be any suitable unit, which is well known in the art. The depth gauge to be described and the combination of the depth gauge and vibratory plow are novel and will be described more fully hereafter.

A bracket 22 is secured to the housing 11. The bracket 22 may be incorporated into a mounting used to mount the motors or maybe a separate bracket which is directly mounted to the housing 11 by suitable means such as nuts and bolts, pins or welding. A depth gauge, generally designated at 30, is shown in an exploded perspective in FIG. 3 and is secured to the bracket 22 and therefore the frame 11. The depth gauge 30 includes a rod 31. The rod 31 has a cylindrical bushing 32 secured to its first end 31a. The bushing 32 has a cylindrical bore 32a formed therein. A pin 33 is mounted inside of an aperture 22a of bracket 22.

Figure 3:
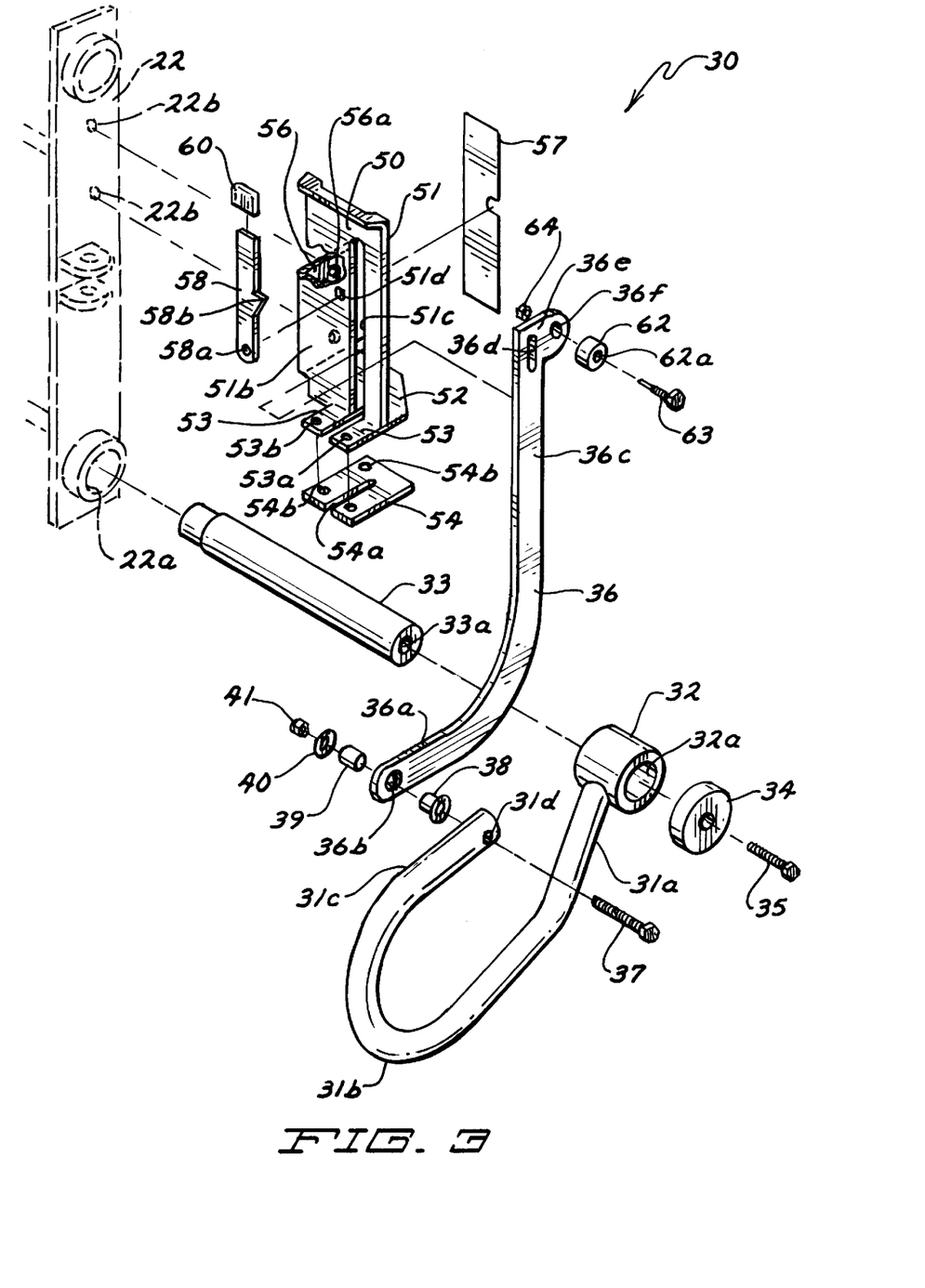
FIG. 3 is an exploded perspective view of the depth gauge used in the vibratory plow shown in FIG. 1.

Typically there is another aperture in a corresponding bracket on the other side of the housing 11 to fully support the pin 33. The bore 32a is positioned around the pin 33 and a washer 34 and screw 35 are used to rotatably hold the bushing 32 onto the pin 33 by the screw 55 engaging a threaded aperture 33a of the pin 33. The rod 31 has an intermediate, ground following portion 31b positioned between the first end 31a and second end 31c. The intermediate portion 31b is generally U-shaped. A bore 31d is formed in the second end 31c.

An indicator bar 36 has a generally J-shape and has a first end 36a pivotally connected to the second end 31c of the rod 31. The first end 36a has an aperture 36b. The pivotal connection is made by use of a screw 37, bushing 38, spacer 39, washer 40, and nut 41. It is understood that other suitable means of mechanically providing a pivotal connection may be utilized. Further, the spacer 39 may be welded into the aperture 36band a grease fitting added. The second end 36c has a slot 36d formed therein. The second end 36c also has an extension section 36e which has an opening 36f.

An indicator plat 50 has a generally rectangular upright section 51 having a first generally planar surface lac and a second planar surface 51b. A slot 51c is generally vertical and extends from proximate the top of the section 51 to the bottom. A second slot 5le extends generally horizontally at the top of the section 51. A base 52 is operatively connected to the bottom of the upright section 51. The base 52 has an opening 52a proximate the slot 51c. The base 52 extends generally 90 degrees from the upright section 51. Two flanges 53 extend rearward from the base 52. The flanges 53 have openings 53a formed therein. The flanges are spaced apart and form an opening that is in vertical alignment with the slot 51c and are an extension of the opening 52a.

Figure 4:
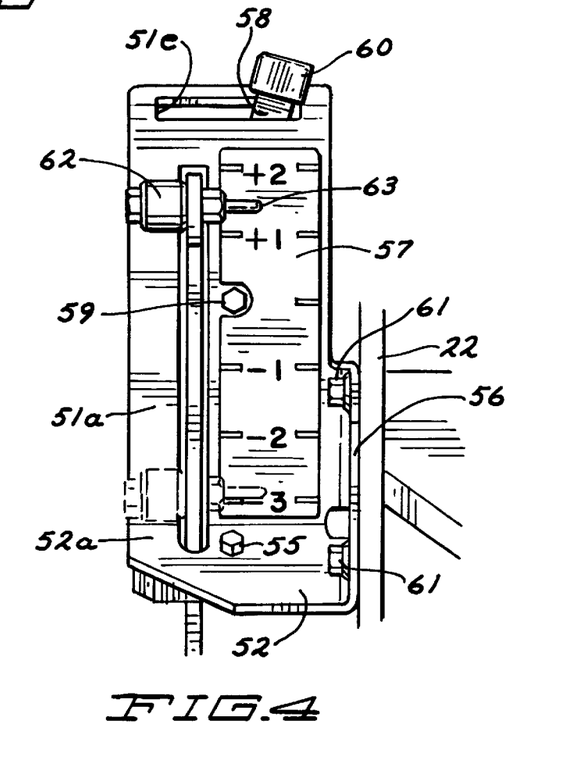
FIG. 4 is a front elevational view of a portion of the depth gauge shown in FIG. 1.

A bearing plate 54 has a slot 54a formed therein. The slot 54a is positioned below the spacing between the two flanges 53. Three openings 54b are formed in the bearing plate 54. The openings 54a are utilized to secure the bearing plate 54 to the base 52 and flanges 53 by suitable means such as bolts 55 and nuts (not shown). The base 52 has an opening (not shown) which is in alignment with one of the openings 54b. A mounting flange 56 is operatively connected to the upright section 51 and extends generally perpendicular from the upright section 51. Two mounting holes 56a, only one of which is shown, are formed in the flange 56. The holes are in alignment with openings 22b which are formed in the bracket 22. Bolts 61 are used to mount the flange 56 to the bracket 22. Preferably, the upright section 51, base 52, flanges 53 and mounting flange 56 are formed from a single piece of metal, such as steel. A decal 57 is adhesively adhered to the first surface 51a of the upright section 51. The decal 57 has height indicators, as will be discussed more fully hereafter. A locking lever 58 is pivotally attached to the upright section 51. The locking lever 58 has an opening 58a through which a suitable fastening device such as a bolt 59 is inserted. The bolt extends through an opening 51 d formed in the upright section 51. A nut (not shown) is used to finish pivotally securing the lever 58 to the upright section 51. The lever 58 has a protrusion 58b which is sized and configured to be received in slot 36d. A cap 60 has a friction fit on top of the lever 58. As shown in FIG. 4, the top of the lever 58 is positioned in the slot 5le. The slot 5le limits the pivoting movement of the lever 51. The lever 58 is used to lock the depth gauge in a locked or transport mode. When the protrusion 58b is removed from the slot 36d, the indicator bar 36 and rod 31 are free to rotate downward and contact the ground.

The top portion of indicator bar 36 is positioned in the slot 54a of the bearing plate 54. The end of the slot 54a prevents the indicator bar 36 from travelling to the right in a horizontal direction as viewed in FIG. 1. A cylindrical bearing 62 has an aperture 62a. The bearing 62 is secured to the extension section 36c by pin 63 and nut 64. The bearing 62 prevents the indicator bar 36 from moving to the left in a horizontal direction as viewed in FIG. 1. The bearing plate 54 and bearing 63 thereby restrain the indicator bar 36 from substantial horizontal movement. There is of course some tolerance involved to allow for a small horizontal movement as the end of the indicator bar moves vertically there would be some minor movement in the horizontal direction. However, this is restrained by the bearings 62 and 54. As can be seen in FIG. 4, the pin 63 extends over the decal 57 and is used as a pointer to identify the position on the measurement indicator on the decal 57.

Figure 5:
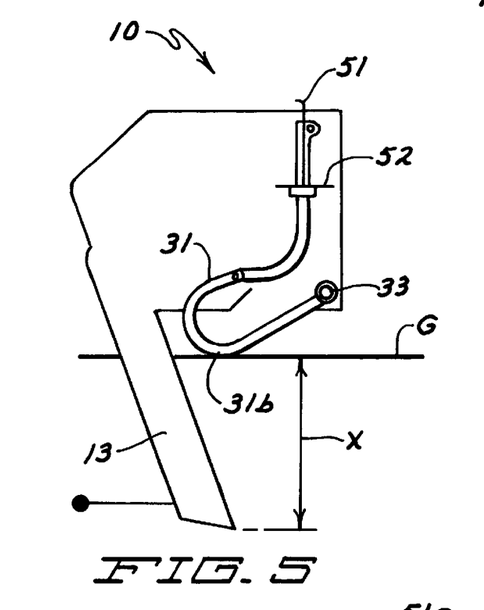
FIG. 5 is a schematic view of the depth gauge at a first depth.
Figure 6:
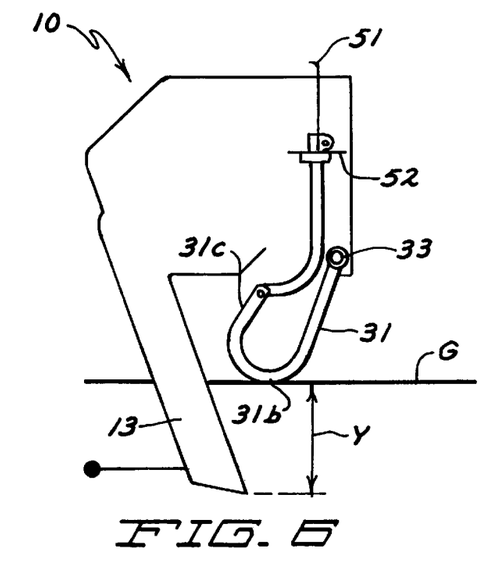
FIG. 6 is a schematic view of the depth gauge at a second depth.

FIG. 5 shows the vibratory plow 10 at a first depth "X" and FIG. 6 shows the plow in a raised position and at a depth indicated by "Y". The direction of travel in both FIGS. 5 and 6 of the vibratory plow is to the right. When the operator desires to raise the vibratory plow 10, suitable hydraulic controls are activated to raise the frame 11 and thereby raising the blade 13. The ground following portion 31b continues to be in contact with the ground as the weight of the rod 31 is sufficient to overcome any frictional forces within the depth gauge 30. In the preferred embodiment, the weight is greater than four pounds and is approximately six pounds. As the housing 11 rises, the rod 31 pivots about the pin 33. Further, the first end of the rod 31 is rotated upward as the housing 11 moves upward. The result of raising the housing 11 results in the indicator plate 50 being raised as well as the pin 63 being lowered. This relative movement is noted on the decal 57. Because of the rotation of the rod 31, there is movement both of the decal upwards as it is attached to the plate 50 and the indicator pin 63 being moved downward, the increments shown on the gauge are not one for one. That is, a one-inch change in depth of the blade 13 reads as a one-inch change on the scale, but a scale reading of one inch is slightly less than one actual inch. It is understood that the housing can be "raised or lowered" when the vibratory plow is going over uneven terrain resulting in the same relative movement as described when the housing is "raised or lowered" by the hydraulic controls.

Figure 7:
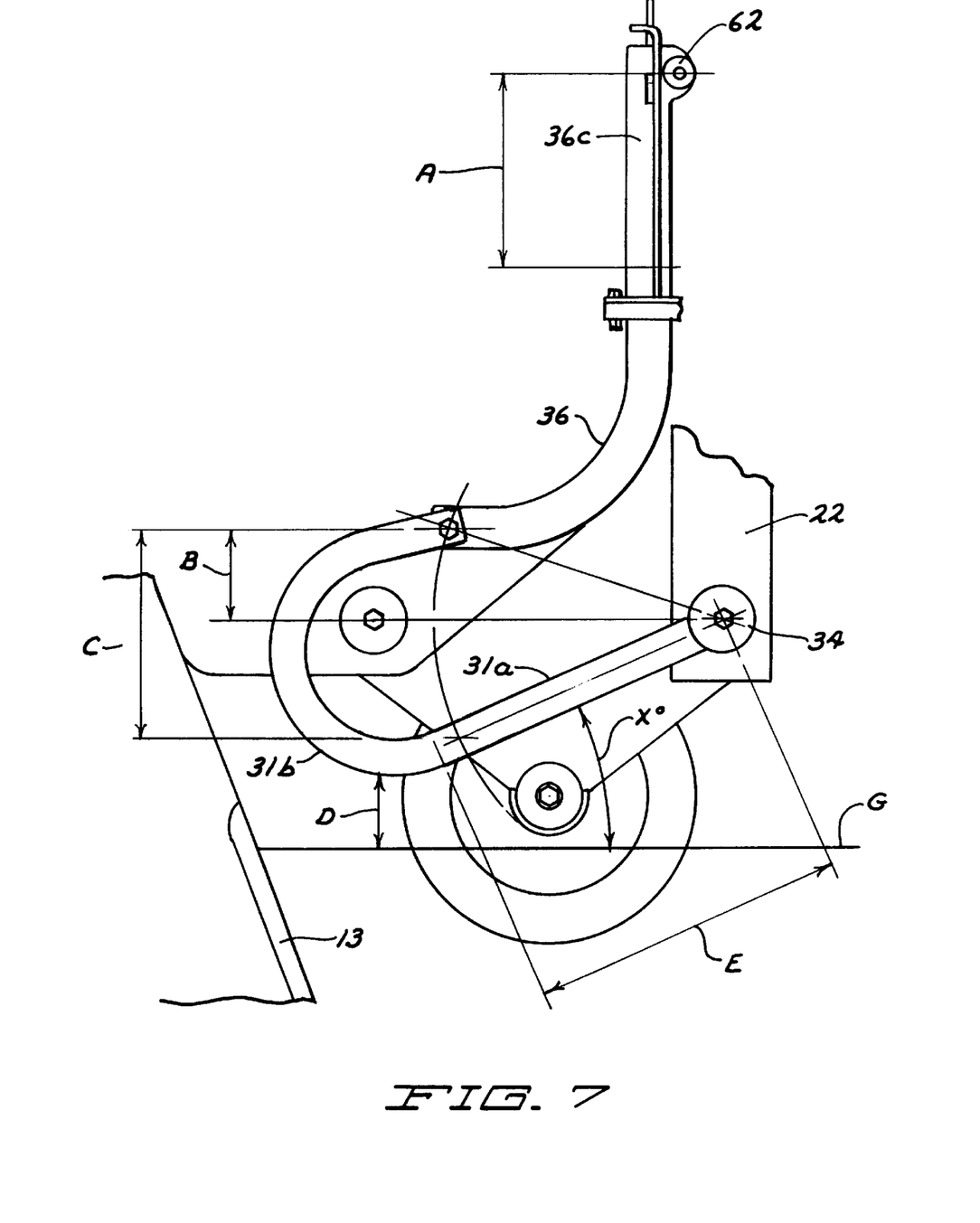
FIG. 7 is a side elevation view of select components of the depth gauge shown in FIG. 1.

FIG. 7 is a side elevational view of selected components of the depth gauge to show relationships with the distance of travel. The depth gauge shown in FIG. 7 is shown in a position when the vibratory plow is in a locked or transport mode. The intermediate portion 31b is at a distance "D" from the ground "G". The overall travel of the depth gauge is indicated by the letters "A" and "C". Reference "B" indicates one-half of the travel. The length of the arm or first end 31a of the rod 31 is indicated by the letter "E". Finally, the angle that the first end 31a of the rod 31 makes with the ground "G" is represented by "X". The arm length and the distance that the first end 3lb is connected to the pin 33 determine the angle "X". As shown in the drawing, the angle "X" is approximately 25 degrees. It is preferred that the angle "X" be in the range of from 25 to 70. This allows the rod 31 to act as a follower. If the angle "X" becomes too great, there is a likelihood that the rod 31 will not act as a follower but could get jammed upward especially when travelling backwards.

The pivot point of the rod 31 is the center of the pin 33. It is preferable that the relative arc of the overall travel is positioned so that a horizontal line passing through the center of the pin 33 will split the travel in half, thereby providing the straightest vertical line of action for the movement of the second end 36c of the indicator bar 36.

This means that when the depth gauge reads 0 or is in a neutral position, the connecting line formed between the second end 31c and the first end 36a with the center of the pin 33 is horizontal.

In operation, the operator will note the depth indicated on the decal 57, which would preferably be at 0. Then, when it is desired to raise the plow, e.g., to avoid another pipe that had been previously placed in the ground, suitable hydraulic controls are actuated to raise the housing and therefore the blade 13, the depth gauge would go up to reflect the amount the blade was raised. The operator is therefore able to more precisely control the depth of the blade and lay the pipe or cable at the desired depth.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A depth gauge for use with a vibratory plow apparatus having a housing for enclosing a vibratory plow mechanism, comprising:
   (a) a rod configured to be pivotally connected to the housing;
   (b) the rod having a first end pivotally connected to the housing, a second intermediate ground following portion and a second end;
   (c) an indicator bar having a first end operatively connected to the second end of the rod and a second end; and
   (d) a depth indicator, the second end of the indicator bar restrained for generally vertical movement proximate the depth indicator, wherein as the housing is raised or lowered, the ground following portion stays in contact with the ground and results in pivotal movement of the rod and in turn a relative vertical displacement of the indicator bar.

2. The depth gauge of claim 1, wherein the rod is made from steel and has a weight sufficient to maintain contact with the ground.

3. The depth gauge of claim 2, wherein the rod is greater than four pounds.

4. The depth gauge of claim 1, further comprising:
   (a) the second end of the indicator bar having an opening; and
   (b) a pivot arm having a first end pivotally mounted to the depth indicator and a second end for engaging the opening of the second end of the indicator bar, wherein the pivot arm may secure the depth gauge in a transport position.

5. The depth gauge of claim 1, wherein the first end of the rod is at a same elevation as the connection of the first end of the bar to the second end of the rod when at a neutral position.

6. The depth gauge of claim 1, further comprising:
   (a) the depth indicator having a plate with a slot formed therein, the plate having a first surface pad a second surface;
   (b) the indicator bar having the second end positioned through the slot of the plate; and
   (c) a securing mechanism attached to the second end of the bar the securing mechanism having a width greater than the slot's width, thereby limiting horizontal movement in a first direction, wherein the second end of the bar is prevented from going through the slot of the plate.

7. The depth gauge of claim 6, further comprising a bearing plate operatively connected to a bottom of the plate, the bearing plate having a slot extending in which the indicator bar is positioned, the slot limiting horizontal movement of the indicator bar in a second direction, 180 degrees from the first direction.

8. The depth gauge of claim 1, wherein the intermediate portion of the rod forms an angle with a ground plane, the angle being less than 70 degrees.

9. The depth gauge of claim 8, wherein the angle is from 25 degrees to 70 degrees.

10. The depth gauge of claim 1, further comprising the ground following portion of the rod is generally U-shaped and the indicator bar is generally J-shaped.

11. A vibratory plow with a depth gauge, comprising:
    (a) a housing for enclosing a vibratory plow mechanism;
    (b) a rod pivotally connected to the housing;
    (c) the rod having a first end pivotally connected to the housing, a second intermediate ground following portion and a second end;
    (d) an indicator bar having a first end operatively connected to the second end of the rod and a second end; and
    (e) a depth indicator, the second end of the indicator bar restrained for generally vertical movement proximate the depth indicator, wherein as the housing is raised or lowered, the ground following portion stays in contact with the ground and results in pivotal movement of the rod and turn in a vertical displacement of the indicator bar.

12. The vibratory plow of claim 11, wherein the rod is made from steel and has a weight sufficient to maintain contact with the ground.

13. The vibratory plow of claim 12, wherein the rod is greater than four pounds.

14. The vibratory plow of claim 11, further comprising:
    (a) the second end of the bar having an opening; and
    (b) a pivot arm having a first end pivotally mounted to the depth indicator and a second end for engaging the opening of the second end of the bar, wherein the pivot arm may secure the depth gauge in a transport position.

15. The vibratory plow of claim 11, wherein the first end of the rod is at a same elevation as the connection of the first end of the bar to the second end of the rod when at a neutral position.

16. The vibratory plow of claim 11, further comprising:
    (a) the depth indicator having a plate with a slot formed therein, the plate having a first surface and a second surface;
    (b) the bar having the second end positioned through the slot of the plate; and
    (c) a securing mechanism attached to the second end of the bar, the securing mechanism having a width greater than the slot's width, thereby limiting horizontal movement in a first direction, wherein the second end of the bar is prevented from going through the slot of the plate.

17. The vibratory plow of claim 16, further comprising a bearing plate operatively connected to a bottom of the plate, the bearing plate having a slot extending in which the bar is positioned, the slot limiting horizontal movement of the bar in a second direction, 180 degrees from the first direction.

18. The vibratory plow of claim 11, wherein the intermediate portion of the rod forms an angle with a ground plane, the angle being less than 70 degrees.

19. The vibratory plow of claim 18, wherein the angle is from 25 degrees to 70 degrees.

20. The vibratory plow of claim 19, wherein the ground following portion of the rod is generally U-shaped and the indicator bar is generally J-shaped.

* * * * *

UNITED STATES PATENT AND TRADEMARK OFFICE
CERTIFICATE OF CORRECTION

PATENT NO. : 6,186,242 B1
DATED : February 13, 2001
INVENTOR(S) : Thomas K. Bricko It is certified that error appears in the above-identified patent and that said Letters Patent is hereby corrected as shown below:

Column 3,
Line 21, delete "lac" and insert therefor -- 51*a* --.

Column 5,
Line 63, insert -- , -- after "bar"--.

Column 6,
Line 31, delete "turn in" and insert therefor -- in turn --

Signed and Sealed this

Seventh Day of August, 2001

*Attest:*

*Attesting Officer*

NICHOLAS P. GODICI
*Acting Director of the United States Patent and Trademark Office*